United States Patent [19]

Haydo et al.

[11] Patent Number: 4,967,579
[45] Date of Patent: Nov. 6, 1990

[54] ADJUSTABLE GUIDE FOR ROTATING CYLINDRICAL MEMBER

[75] Inventors: Donald H. Haydo, Lawrence County; William H. Berg, Allegheny County, both of Pa.

[73] Assignee: Italimpianti of America, Inc., Coraopolis, Pa.

[21] Appl. No.: 416,386

[22] Filed: Oct. 3, 1989

[51] Int. Cl.⁵ .............................................. B21B 39/14
[52] U.S. Cl. ............................................. 72/95; 72/428
[58] Field of Search .................... 72/95, 96, 97, 428, 72/250; 226/199; 82/164; 269/156

[56] References Cited

U.S. PATENT DOCUMENTS 3,101,015  8/1963  Schuetz ................................. 72/97

FOREIGN PATENT DOCUMENTS 3240146  5/1984  Fed. Rep. of Germany ...... 226/199
90312    5/1983  Japan ..................................... 72/250
2121338 12/1983  United Kingdom ................... 72/97

Primary Examiner—Lowell A. Larson
Attorney, Agent, or Firm—Webb, Burden, Ziesenheim & Webb

[57] ABSTRACT

An adjustable guide for suppporting an elongated, generally cylindrical member having an axis that substantially coincides with a pass line of a metal working machine, said guide comprising a support stand which is stationary relative to said pass line and at least three radially adjustable guide shoes preferably having concave inner surfaces circumscribed about said cylindrical member pivotably mounted on said support stand such that said guide provides substantially continuous 360° containment of said cylindrical member.

9 Claims, 2 Drawing Sheets

ADJUSTABLE GUIDE FOR ROTATING CYLINDRICAL MEMBER

FIELD OF THE INVENTION

This invention relates to an adjustable guide. More particularly, this invention relates to an adjustable guide for providing substantially continuous 360° containment to a rotating cylindrical member such as, for example, bars and tubes in a seamless tube mill.

BACKGROUND OF THE INVENTION

In the field of metal working, it is often necessary to accurately guide a cylindrical member such as a tube or bar, usually of a remarkable length, between feeding means and a machine for working the member, or between a work station and a run-out table, or between the various processing stations of a large scale facility or production line. During processing, the diameter of the cylindrical member may vary, for example, as the cylindrical member is reduced by rolling in passing from one work station to another. Also, in the processing of cylindrical members of varying diameters on the same process line or mill, the problem arises of compulsorily changing the dimensions of the guides along a pass line in which the cylindrical member travels. This problem may not only incur significant down-time of the machine or production line with inherent production losses, but also the requirement of skilled personnel for substituting existing guides with guides of a different diameter to accommodate a cylindrical member of a different diameter.

A plurality of guides are used to support a cylindrical member in a piercer, elongator or straightener portion of a seamless tube mill for the manufacture of elongated seamless tubing. For example, in a seamless tube mill, one of the initial operations is the piercing of a heated or unheated cylindrical metal billet or bar by a pair of angularly disposed driven mill rolls which force the billet or bar over a piercing point on an end of an elongated mandrel bar. Since the billet is rotated by the mill rolls as it is fed over the piercing point, it is accordingly necessary to support the piercing point and the attached elongated mandrel bar for rotation within the rotating billet. The mandrel bar extends away from the mill rolls in the direction of longitudinal movement of the billet over the piercing point for a distance that is at least as great as the length of the longest shell or tube to be formed on the mill. Lengths of upwards of 30 feet are not uncommon. The rear end of the mandrel bar is rotatably supported by a suitable mandrel carriage which is adapted to withdraw the bar from the tube so that the tube can be removed from an outlet table on which it is received after the piercing operation, and then to return the bar to its working position with its piercing point adjacent the mill rolls.

During the piercing operation, a large compressive load is typically exerted on the rotary mandrel bar. In order to support the mandrel bar and prevent it from buckling and vibrating under the high compressive loads as it is rotated during the piercing operation, the bar must be rotatably supported by some type of guide. Moreover, a guide must also rotatably support and steady the pierced portion of the tube having the mandrel passing therethrough as it axially travels away from the piercer rolls.

One type of guide for supporting and containing a mandrel and tube in the piercing segment of a seamless tube mill is a moveable three-roller cluster arrangement disclosed in U.S. Pat. No. 3,101,015 to Schuetz. The three-roller clusters are arranged in spaced-apart stands along the run-out table of the mill. The three-roller support of Schuetz is suitable for use in the piercing segment due to the fact that the elongated mandrel bar remains inside the tube or shell which, in part, prevents the rotating shell from leaving the center of the roller cluster. When the rollers are expanded to accommodate larger diameter tube sizes, the spaces between adjacent rollers become too great to insure 360° tube containment in a mandrelless elongator operation. After the mandrel has been withdrawn, the hollow tube or shell is commonly contained in a box-like enclosure which supports the rotating shape after it is further rolled in the elongator segment of the seamless tube mill.

U.S. Pat. No. 2,104,117 to Findlater discloses a bar guide utilizing two arms having semicircular guide troughs which are longitudinally offset from each other to accommodate various diameter tubes. The guides of Findlater do not offer a wide variety of diameter adjustments or continuous 360° containment in a rotating mandrelless tube operation.

U.S. Pat. No. 2,686,444 to Reichl discloses a roller guide including a plurality of adjacent tube support guide rolls about a longitudinal axis attached to adjustable crank levers. The levers are mounted to a frame and can be variably adjusted. The roller guide of Reichl does not offer 360° containment at larger tube diameters due to one point contact made by each roller guide.

Similar types of mandrel bar steadiers and mandrelless bar steadiers are also required in other types of machines handling tubes. Therefore, while the present invention is particularly suited for use in connection with both the piercing and elongator segments of a seamless tube mill, it is to be understood that the present invention also finds application in other tube making or handling equipment in which a rotating cylindrical member must be supported.

The present invention provides an adjustable guide for supporting a rotating bar or tube, whereby a mandrel bar can be accurately, rotatably held in a desired position with respect to the billet being pierced so that the operation can be carried out without substantial buckling or vibration of the mandrel bar.

More particularly, the present invention provides identical guides for use in both the piercing segment and in the elongator segment of a seamless tube mill whereby the need for the separate roller guides and box enclosures heretofore needed for these mill segments is eliminated. The present invention permits the use of one adjustable guide for operation in both the piercer and elongator segments of a mill to provide a seamless tube mill of substantially reduced size by combining the piercer and elongator segments into one segment.

Another object of the invention is to provide an adjustable guide which allows for the guiding of mandrelless cylindrical members of different diameters in a variety of processing equipment.

A further object of the invention is to provide an adjustable guide for cylindrical members which is of simple construction, easy to use, reliable in operation, as well as relatively economical in cost.

SUMMARY OF THE INVENTION

Briefly, according to this invention, there is provided an adjustable guide for supporting an elongated generally cylindrical member in solid bar or tubular form, either containing a mandrel or not containing a mandrel. The cylindrical member may be of any conventional size diameter, having a longitudinal axis that substantially coincides with a pass line of a metal working machine, such as a seamless tube mill. The adjustable guide includes a support stand which is stationary relative to the pass line. Preferably, a plurality of such support stands are spaced along the pass line. Mounted on each of the support stands are at least three radially adjustable guide shoes preferably having substantially concave inner surfaces symmetrically positioned about the pass line for simultaneous selective pivotal movement toward and away from the pass line, whereby in use, the guide shoes are circumscribed about a cylindrical member such that the guide shoes provide substantially continuous 360° containment of the rotating cylindrical member. An upper shoe is provided with suitable linkages and motive means to be pivotably moved away from the pass line to permit upward ejection of a processed cylindrical member.

BRIEF DESCRIPTION OF THE DRAWINGS

Further features and other objects and advantages of this invention will become clear from the following detailed description when taken with reference to the drawings in which.

DESCRIPTION OF THE PREFERRED EMBODIMENTS

Figure 1:
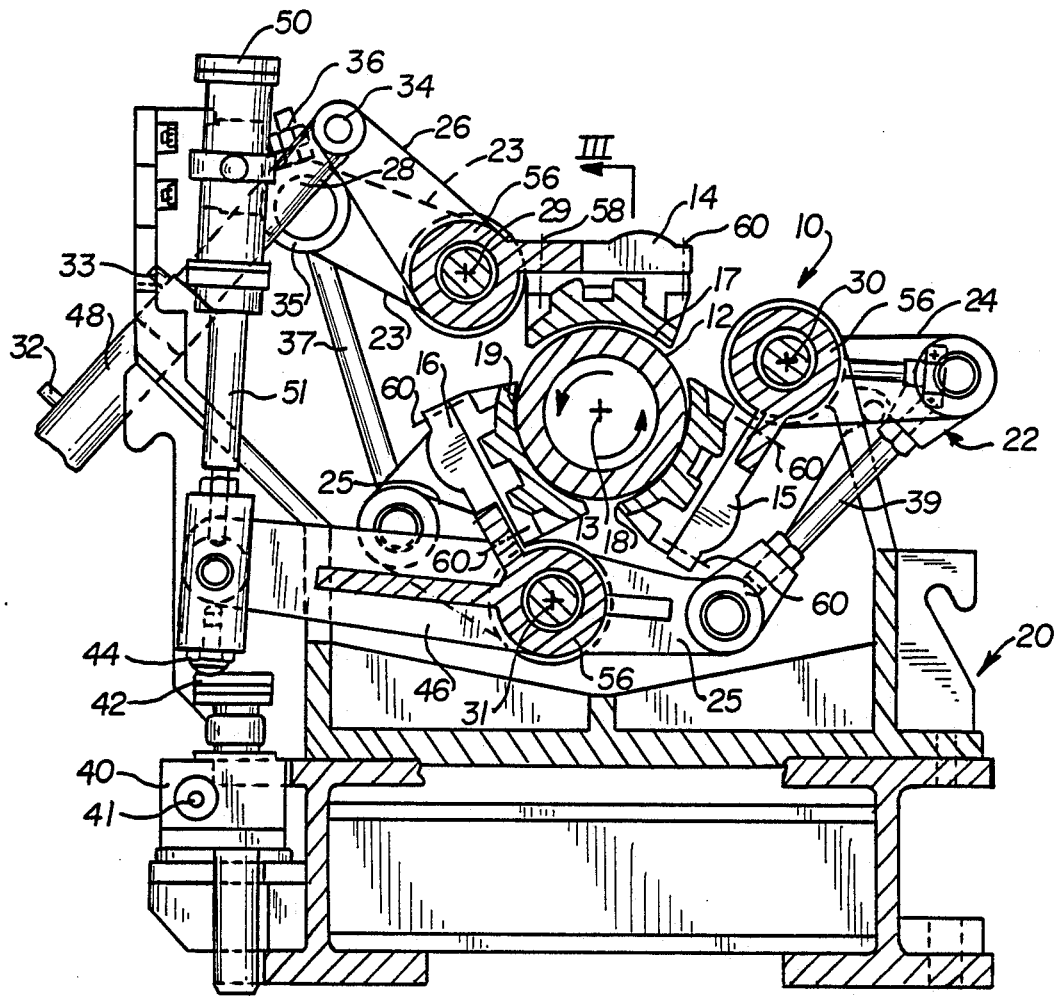
FIG. 1 is a front view of an adjustable guide with a cylindrical member supported therein.
Figure 2:
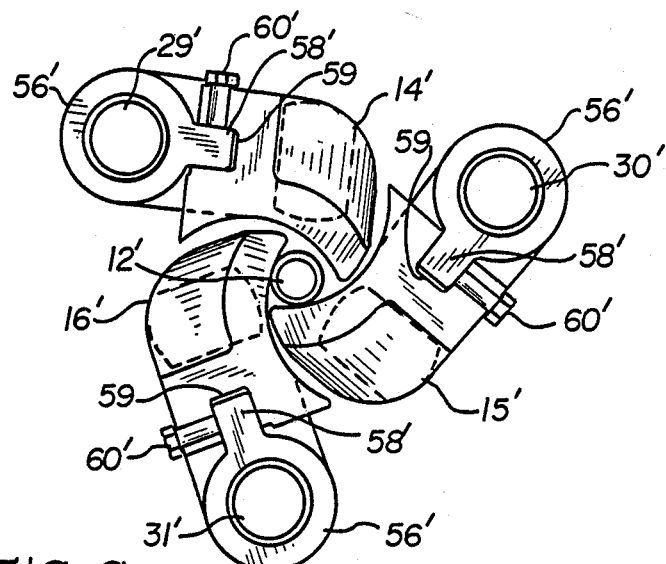
FIG. 2 is a front view of an adjustable guide with a cylindrical member supported therein of a diameter smaller than that shown in FIG. 1.
Figure 3:
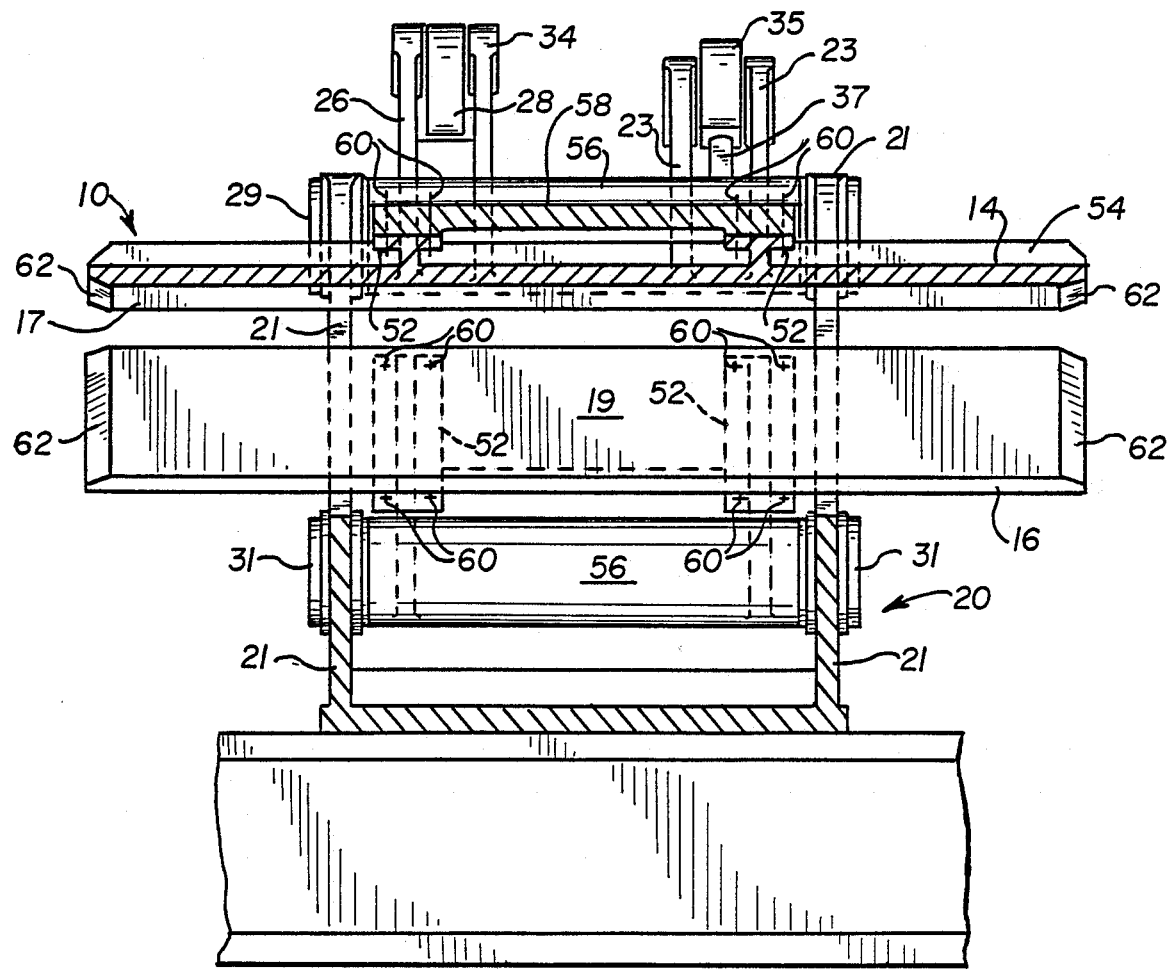
FIG. 3 is a cross-sectional side view taken along line III—III of FIG. 1, but with the cylindrical member removed.

Referring to the drawings, wherein like reference characters represent like elements, FIGS. 1-3 show an adjustable guide 10 for supporting an elongated generally cylindrical member 12 depicted in the drawings as a tubular shape. The adjustable guide includes three moveable guide shoes 14, 15 and 16, each preferably having a generally concave-shaped inner supporting surface 17, 18 and 19, respectively. The concave supporting surfaces of each shoe surround a pass line 13 for the cylindrical member 12. The pass line 13 is substantially coextensive with the longitudinal axis of the cylindrical member 12. The combined area of the concave surfaces 17, 18 and 19 is large enough to support the largest diameter of cylindrical member 12 commonly processed on the metal working equipment.

The guide shoes 14, 15 and 16 are mounted on a support frame or stand 20 by a mechanical parallel linkage 22, FIG. 1. The mechanical linkage 22 is secured to transversely extending side frame members 21 of the support stand 20, FIG. 3.

As shown in FIG. 1, all of the guide shoes 14, 15 and 16 of the adjustable guide 10 are interconnected by the mechanical linkage 22 to permit common radial retraction and extension of the guide shoes, as desired. The opening and closing of the adjustable guide 10 by the mechanical linkage 22 may be affected by employing any conventional power-assisted means, such as a hydraulic, mechanical, electromechanical or pneumatic means. The mechanical linkage 22 allows the guide shoes 14, 15 and 16 to open and close simultaneously and concentrically about the axis 13 of the cylindrical member 12.

The mechanical linkage 22 is mounted within the support stand 20 arranged along the pass line which is substantially coincident with the longitudinal axis 13 of the member 12 which extends transversely to the plane of the drawing. The mechanical linkage 22, shown in FIG. 1, is cooperatively constructed and includes lever arms 23, 24 and 25 connected to shoes 14, 15 and 16, respectively. The lever arms are, in turn, connected to crosspieces 26, 27 and 28. The lever arms 23, 24 and 25 are pivotally mounted about fixed shafts 29, 30 and 31, respectively. Each axis of the shafts 29, 30 and 31 is disposed equidistant and equiangularly around the axis 13 of the cylindrical member 12. The shafts 29, 30 and 31 are fixed to and between side frame members 21 of the support frame 20.

FIGS. 1 and 2 illustrate the adjustable guide 10 in a guiding position closed about cylindrical members 12 of varying diameter. The guide shoes 14, 15 and 16 are positioned equidistant to the pass line and axis 13 and close simultaneously such that the guide shoes move to a nested configuration when in the closed position situated about the small diameter cylindrical member 12' shown in FIG. 2. As shown in the drawings, the present invention provides substantially 360° containment irrespective of the size of the cylindrical member diameter in a piercer, elongator or straightener portion of a seamless tube mill. The concave inner surfaces 17, 18 and 19 of each of the respective guide shoes 14, 15 and 16 are contoured to conform substantially to the curved form of a portion of the circumference of the largest cylindrical member to be supported therein. The number of guide shoes 14, 15 and 16 necessary to support the cylindrical member 12 is a function of the diameter of the cylindrical member and the radius of curvature of the concave inner surfaces 17, 18 and 19 of the guide shoes 14, 15 and 16. Applicant has found that three guide shoes, each guide shoe having an appropriate radius of curvature allows an adjustable guide 10 to provide 360° containment to a cylindrical member 12. The radius of curvature of the guide shoes is proportioned to match the diameter of the largest expected tube diameter. By way of example, guide shoes having a radius of curvature of 10 inches could accommodate a cylindrical member 12 of a maximum diameter of about 20 inches.

As shown in FIG. 3, the longitudinal length of the guide shoes 14, 15 and 16 along the pass line extends beyond the transverse side frame members 21 of the support stand 20. Thus, the guide shoes provide a much greater length of tube supporting surface compared with that commonly provided by a conventional roller cluster arrangement. The roller guides are limited in length by the location of their respective bearing assemblies which are confined by the side frames 21. Typically, the guide shoes of the present invention have a length that is approximately three times greater than the length of the conventional roller guides of Schuetz, when positioned in a similarly sized support stand 20. Thus, the guide shoes of the present invention provide substantially greater containment and support than the conventional roller guides of Schuetz.

The elongated guide shoes 14, 15 and 16 are constructed of a ferrous material, such as cast iron, and, as best seen in FIG. 3, have a pair of flanged mounting feet 52 outwardly extending from the rear face 54 thereof. The mounting assembly includes cylindrical members 56 which are rotatably mounted about the fixed axes of the shafts 29, 30 and 31 fixed within the transverse side frame 21. The cylindrical members 56 each include an integral mounting flange 58 which is bolted at phantom lines 60 to the mounting feet 52 of the guide shoes. The guide shoes also preferably have beveled regions 62 formed at their respective terminal edges to provide a tapered lead for receiving an advancing tubular shell supported in a mandrel. The beveled region 62 at each end permits the guides to be used interchangeably, and in reversible orientation, decreasing the expense of maintenance and spare-part inventory. It is appreciated that the guide shoe construction of the invention is significantly less costly than the conventional rollers and bearing assemblies of the commonly used prior art guides.

A slightly modified guide shoe construction and mounting scheme is depicted in FIG. 2. It will be appreciated that the guide shoes depicted in FIG. 2 are configured and mounted differently than the guide shoes of FIGS. 1 and 3. Guide shoes 14', 15', and 16', of FIG. 2 have notches 59', formed in respective end portions which are fitted onto flanges 58' of the cylindrical members 56'. Bolts 60' secure the guide shoes to the flanges 58' of the rotatable cylindrical members 56' for pivotal movement about the fixed axes of the shafts 29', 30' and 31'.

At least one guide shoe, preferably the upper most guide shoe 14 of each adjustable guide 10, is capable of being swung away from the pass line 13 to permit the removal of the cylindrical member 12 therefrom. Guide shoe 14 is swung by hydraulically actuated arm 26 which is pivotally connected at 34 to piston rod 28 of hydraulic cylinder 48, FIGS. 1 and 3. The operation of the mechanical linkage is well-known and more fully described in U.S. Pat. No. 3,101,015 to Schuetz. The arm 26 is selectively moved by the piston rod 28 of the angularly positioned hydraulic cylinder 48 to upwardly swing the guide shoe 14 about shaft 29 when piston rod 28 is retracted. The guide shoe 14 is returned to a guiding position when the piston rod 28 is in an extended position as shown in FIG. 1. The hydraulic cylinder 48 is mounted on the support frame 20 and has a fluid conduit 32 connected to its lower closed end and a fluid conduit 33 connected to its upper piston rod end. The conduits 32 and 33 communicate through suitable control means (not shown) with a suitable source of hydraulic fluid under pressure, which is also not shown.

The lever arm 23 is rigidly coupled to guide shoe 14 to pivot about the shaft 29. The end of lever arm 23 is pivotally secured to a trunnion member 35 which is bored transversely of the pivot axis to slidably receive the end of a rod-shaped link arm 37. The lower end of the link arm 37 is pivotally connected to the end of pivot arm 25. The trunnion member 35 has a flat top surface adapted to bear against the bottom of a pair of adjusting nuts 36, through a washer, if desired. The nuts 36 are adjustably threaded on the end of link arm 37 to permit adjustment of the distance between the crossarm pivot axes on lever arms 23 and 25. Preferably, this distance is adjusted to be equal to the distance between the axes of shafts 29 and 31, about which axes the shoes 14 and 16 pivot. Consequently, so long as the top surface of the trunnion member 35 bears against the underside of adjusting nuts 36, the shoes 14 and 16 move in unison the same angular amount and in the same direction, since the pivot axes 29 and 31 are at all times spaced equally from the pass line 13 and have an identical angular relation to each other. The geometry of the axes locations and other dimensions of the mechanical linkage 22 is such that so long as the top surface of the trunnion member bears against the adjusting nuts 36, all three guide shoes 14, 15 and 16 are equidistantly spaced from, and equiangularly spaced around, the pass line 13. However, since trunnion member 35 is slidably mounted on a link arm 37, it may be moved downwardly away from the adjusting nuts 36 when the piston rod 28 is retracted, causing the arm 26 to pivot downwardly and guide shoe 14 to move away from the pass line independently of the other guide shoes and permit selective upward removal of the cylindrical member 12 when desired.

Associated with each of the adjustable guides 10 is a jack 40 located so that its moveable top surface 42 bears against the curved lower bearing surface 44 of the lever arm 46 coupled to the guide shoe 16. In the illustrated apparatus, each of the jacks 40 is of a conventional, worm-gear type and is adapted to be raised and lowered simultaneously and the same amount, by suitable rotation of a shaft 41 which extends longitudinally of the support stand and actuates the jacks 40 for all guide stands 10. In this manner, all guide stands assume an identical reference closing diameter.

Each of the guide shoes illustrated also includes means for removing the cylindrical member laterally upward when the guide shoes are moved out of the way. Such means includes a pair of arm members (not shown) located at opposite ends of the guide shoes 14, 15 and 16 and are adapted to be raised and lowered by a common shaft to which they are rigidly fixed.

The preferred method of operation of the present invention is as follows.

At the beginning of the cycle of operation, the jacks 40, at each of the guide stands 10, are all adjusted simultaneously by activating the adjustment shaft so that the top surfaces 42 are located at identical heights. When the jacks 40 are contacted by lower surfaces 44 on the levers 46 of the guide shoes, the surfaces 42 locate all guide shoes in identical spaced positions to accept a cylindrical profile of a given diameter. The guide shoes 14, 15 and 16 are then moved inwardly toward the pass line 13 and the cylindrical member 12 until they contact the cylindrical member. This is accomplished by opening the valves in the conduits 32 and 33 of hydraulic cylinder 48 to permit hydraulic fluid to flow freely into and out of such cylinder, and by supplying hydraulic fluid under pressure to the closed end of hydraulic cylinder 48. As a result, the piston rod 28 of cylinder 48 moves in an upward direction moving the cross arm 26 pivotally connected to it. This causes pivotal movement of guide shoe 14 about axis 29, causing guide shoe 14 to move inwardly toward the pass line until the guide shoe contacts the cylindrical member 12. This movement also causes the lever arms 23 to move upwardly until the surface of trunnion member 35, pivotally carried by the arms 23, contacts the underside of adjusting nuts 36 on link arm 37 causing upward movement thereof. Upward movement of link arm 37 causes pivotal movement of arms 25 and 45 in a clockwise direction about shaft 31 which simultaneously moves guide shoe 16 inwardly to contact the cylindrical member 12 while moving the other end of arm 25 in an upward direction. Arm 25 is pivotally connected to a link arm 39 which has its upper end pivotally connected to arm 24, coupled to guide shoe 15. Upward movement of the arm 25 causes simultaneous pivotal closing of the guide shoe 15; the guide shoes being so moved until they bear against the cylindrical member. The axes 29, 30 and 31 and guide shoes 14, 15, and 16 are equidistantly spaced from, and equiangularly spaced around, the pass line 13 and equidistantly and equiangularly spaced from adjacent guide shoes. When all the guides thus contact the cylindrical member, the hydraulic pressure increases in the conduit of cylinder 48 to a magnitude at which it actuates a pressure responsive switch, not shown, which controls the valves in the fluid conduits of the cylinders so that all fluid conduits to such cylinders are closed. This prevents the guide shoes 14, 15 and 16 from being forced outwardly back, except a small amount permitted by fluid compressibility, but does not cause the guide shoes to bear on the cylindrical member with sufficient force to inhibit rotation.

It is, at times, necessary to simultaneously move the guide shoes 14, 15 and 16 outwardly from the pass line, such as in the case when the shoes are guiding a smaller diameter mandrel bar. The guides at some point must move to an expanded diameter to guide an approaching pierced shell. In such instances, hydraulic fluid under pressure is admitted to the hydraulic cylinder 50 so that attached piston rod 51 moves the end of arm 46 downwardly until it contacts the top surface 42 of the jack 40 which is preset at the described diameter of the expanded shell dimension. Simultaneously, hydraulic fluid under pressure is introduced through conduit 32 into the hydraulic cylinder 48 to move the piston rod 28 upwardly, while also raising the lever arm 23 upwardly; the movement of which is limited by the trunnion 35 bearing against the adjustment nuts 36. Since the hydraulic cylinder 50 has a larger diameter, it exerts a greater force than hydraulic cylinder 48 and thus controls the outward, simultaneous movement of the guide shoes 14, 15, 16.

It will be appreciated that because of the contoured concave surfaces 17, 18 and 19 and the variable adjustment of the guide shoes 14, 15 and 16 by the mechanical linkage 22, the adjustable guide 10 may be altered to support cylindrical members 12 of varying dimensions.

While the surfaces 17, 18 and 19 of the guide shoes 14, 15 and 16 are described above and depicted in the drawings as preferably having a concave contour, it will be understood that other surface contours could be employed. For example, the surfaces 17, 18 and 19 of the guide shoes could have flat, V-shaped, or some other contour which will provide substantially continuous 360° containment of the cylindrical member, in the same manner as the concave contour previously described. In this manner, a rotating mandrelless cylindrical member is surrounded and contained 360° by the guide surfaces 17, 18 and 19 which prevents the tube from escaping as is the case with the roller cluster guides of the prior art.

Having described the presently preferred embodiments of the invention, it is to be understood that it may be otherwise embodied within the scope of the appended claims.

We claim:

1. An adjustable guide for supporting rotating elongated, generally cylindrical members of various diameter, each having an axis that substantially coincides with a pass line, said guide comprising:
   (a) a support stand which is stationary relative to said pass line;
   (b) at least three radially adjustable guide shoes having stationary inner surfaces circumscribed about said rotating cylindrical member; and
   (c) means for pivotally mounting said guide shoes on said support stand for simultaneous radial movement relative to said pass line such that said stationary inner surfaces of the guide shoes provide substantially continuous 360° containment of said rotating cylindrical member.

2. The adjustable guide as set forth in claim 1 wherein the stationary inner surfaces of the guide shoes each have a substantially concave shape.

3. The adjustable guide as set forth in claim 1 wherein said mounting means include mechanical linkage means for interconnecting said guide shoes to permit simultaneous movement of said guide shoes for radial retraction and extension of said guide shoes about the pass line.

4. The adjustable guide as set forth in claim 3 wherein said mechanical linkage means includes a plurality of crosspieces interconnected to a plurality of lever arms interconnected to said guide shoes such that the guide shoes cooperatively, radially retract and extend about the rotating cylindrical member.

5. The adjustable guide as set forth in claim 3 wherein said rotating cylindrical member includes a rotating mandrel positioned therein.

6. The adjustable guide as set forth in claim 3 wherein said rotating cylindrical member is a mandrelless tube.

7. The adjustable guide as set forth in claim 5 wherein each of said adjustable shoes extend beyond said support stand in a direction along the pass line to provide an increased supporting surface area for the rotating cylindrical member.

8. The adjustable guide as set forth in claim 7 wherein each guide shoe has a stationary concave inner surface with a radius of curvature proportioned to the diameter of the cylindrical member to be guided.

9. The adjustable guide as set forth in claim 8 wherein each lever arm pivots about a separate fixed axis, said fixed axes spaced equidistant from and equally angularly disposed around the axis of the rotating cylindrical member.

* * * * *